United States Patent [19]

Alvarez, Jr.

[11] Patent Number: 5,619,535
[45] Date of Patent: Apr. 8, 1997

[54] DIGITAL FREQUENCY SYNTHESIZER

[76] Inventor: Cesar E. Alvarez, Jr., 6028 Lynn Lake Dr. South, Apt. 238, St. Petersburg, Fla. 33712

[21] Appl. No.: 281,289

[22] Filed: Jul. 27, 1994

[51] Int. Cl.$^6$ ................................................. H04L 27/20
[52] U.S. Cl. .......................... 375/308; 364/746; 332/103; 327/106; 327/129
[58] Field of Search ..................................... 375/279, 308; 327/105, 106, 107, 129; 331/34, 56, 107 R, 187, DIG. 3; 364/718, 721, 746; 328/14; 455/260; 332/103–105

[56] References Cited

U.S. PATENT DOCUMENTS

| | | | |
|---|---|---|---|
| 4,816,805 | 3/1989 | Vojir et al. ................................ | 341/83 |
| 5,095,279 | 3/1992 | Quan et al. ............................... | 327/129 |
| 5,202,846 | 4/1993 | Rasmussen et al. ..................... | 364/721 |
| 5,430,764 | 7/1995 | Chren Jr. et al. ........................ | 375/308 |

*Primary Examiner*—Stephen Chin
*Assistant Examiner*—Amanda T. Le
*Attorney, Agent, or Firm*—Joseph C. Mason, Jr.; Louise A. Foutch; Mason & Associates, P.A.

[57] ABSTRACT

A digital frequency synthesizer employs a predetermined residue number system to generate phase angle information. The phase angle information is then converted from the predetermined residue number system into a weighted binary number. A part of the weighted binary phase angle information is used to address a read only memory that includes predetermined initial data points at each address. A predetermined iteration process that makes use of some or all of the weighted binary phase angle information that was not used to address the read only memory is then employed in an iterative process to generate final data points for the predetermined waveform. The initial data points are stored in the read only memory as weighted binary numbers and the iterative process employs weighted binary arithmetic. A second embodiment stores the initial data points in the read only memory as digits from a predetermined residue number system and the iterative process employs residue number system arithmetic. A third embodiment stores the initial data points in the read only memory as digits from a predetermined quadratic residue number system and the iterative process employs quadratic residue number system arithmetic. The final data points calculated in the second and third embodiments are converted from the predetermined residue number system or the predetermined quadratic residue number system respectively into a weighted binary system number before they are converted into analog form by a digital to analog converter.

17 Claims, 3 Drawing Sheets

DIGITAL FREQUENCY SYNTHESIZER

BACKGROUND OF THE INVENTION

1. Field of the Invention

This invention relates to devices for generating periodic waveforms. More particularly, it relates to digital frequency synthesizers, direct digital synthesizers, or digital phase locked loops, for example, that generate a periodic waveform having enhanced spectral purity, faster operational speeds, and greater flexibility in performance optimization and waveform selection.

2. Description of the Prior Art

Digital frequency synthesis is a method for digitally generating periodic waveforms (often sinusoidal waveforms) when precise frequency resolution is desired. There are many applications that require a stable, low noise source for the synthesis of a periodic waveform. For example, radar applications call for the generation of a detection sinusoid. Radar applications also require such means for generating a chirp radar pulse. Obviously, any error in the detection sinusoid will result in reported detection of a frequency that is different from the actual frequency by the cumulative amount of the error. Similarly, any error in a transmitted chirp pulse will result in a transmitted chirp pulse different from the desired chirp pulse by the cumulative amount of error in the synthesized periodic waveform. Digital synthesis of periodic waveforms is preferred over analog generation because less noise is produced and digital sources are more stable. Digital components are also generally lighter in weight, less expensive, more easily implemented as integrated circuits, and more reliable. Moreover, digital systems provide enhanced frequency resolution.

Known methods of digitally generating periodic waveforms follow two primary steps: phase angle calculation and a look-up of the quantized waveform data point, corresponding to the calculated phase angle value, from a read only memory. The phase angle calculation is performed using weighted binary numbers, and the quantized waveform data points are also stored as weighted binary numbers in the read only memory.

More particularly, the method heretofore employed includes the steps of adding a numerical word stored in a phase increment register to a phase angle accumulator at a sample clock frequency. The numerical value of the phase increment word and the numerical capacity of the accumulator determine the overflow frequency of the accumulator, i.e., for an accumulator of any fixed numerical capacity a large phase increment value causes the accumulator to reach its maximum value and overflow more frequently, whereas a small phase increment value causes the overflow to occur less frequently. The numerical capacity of the accumulator determines the frequency resolution of the digital synthesizer, i.e., a large numerical capacity for the accumulator allows for a finer frequency resolution, whereas a smaller numerical capacity for the accumulator results in a grosser frequency resolution. For an accumulator of fixed numerical capacity the overflow of the accumulator, representing one period of the waveform being synthesized, is controlled by controlling the value in the phase increment register. A numerical representation of a phase angle is generated each sample clock when the accumulator is incremented by the value of the phase increment word. The numerical capacity of the accumulator represents a phase angle of $2\pi$ radians. When this numerical capacity is reached the accumulator overflows beginning another period of the waveform. Each phase angle is used to address a read only memory containing the corresponding data point of the desired digitized waveform. The read only memory thus generates a series of digitized waveform samples, at the sample clock frequency, that produce a digitized periodic waveform at the overflow frequency of the accumulator. The final waveform that may be used in an application is then created by applying the digitized waveform samples to a digital-to-analog converter which is then low pass filtered. The digital-to-analog converter changes the digitized waveform into a staircase approximation of the periodic waveform in analog form. The low pass filter removes the higher frequency sampling components from the staircase approximation resulting in a more desirable analog waveform.

There are four sources of error, prior to the digital-to-analog converter, inherent within this well known approach. The first two sources of error result from the finite word length of the accumulator. The first source is a phase quantization error ($e_{pq}$) that results from the fact that during the time period between sample clocks the output of the accumulator, and thus the phase of the digitized waveform, remains constant while the phase of the desired periodic waveform would be increasing linearly. This error can be reduced by increasing the numerical capacity of the accumulator allowing for a finer frequency resolution. Increasing the numerical capacity of the accumulator, however, increases the computation time of the accumulator because the prior art employs a weighted binary system for this calculation. In weighted binary systems, carry information from less significant binary digits must propagate and be included in the calculations for more significant digits. As the binary number becomes large more binary digits are required and thus more carry propagation delay.

The second error occurs (phase remainder or $e_{pr}$) because the finite word length of the accumulator causes it to act as a fractional divider for some values of the phase increment word. Specifically, the output frequency of the accumulator (the overflow rate) is directly proportional to the value of the phase increment word and inversely proportional to the numerical capacity of the accumulator. If the numerical capacity of the accumulator is an integer multiple of the phase increment word, the accumulator will return to the same initial value each time it overflows and the zero crossings of the phase of the digitized waveform will coincide precisely with the zero crossing of the phase of the desired analog waveform. The numerical capacity of the accumulator, however, is often not an integer multiple of the phase increment word. For these values of the phase increment word the accumulator behaves as a fractional divider, i. e., the accumulator will overflow and not return to its original value. The series of resulting accumulator remainder values is periodic and modulates the output of the phase accumulator to produce some waveforms with a period less than the desired period and some waveforms with periods greater than the desired period but with an average waveform period equal to the desired waveform period over the period of the remainder values. This modulation creates sidebands, also known as line spurs, in the output spectrum of the generated waveform.

One method of reducing these line spurs in the prior art is to add a pseudo-random number to the least significant bits of the accumulator so that the remainder series is not periodic. This method reduces the energy in the lines spurs by spreading their energy over a wide (white noise) range of frequencies. This in turn raises the noise floor of the spectrum.

Another way of reducing these line spurs is to use values of phase increment words that maximize the period of the remainder sequence. The period of this remainder sequence is inversely proportional to the greatest integer factor common to both the numerical value of the phase increment word and the numerical capacity of the accumulator. A greatest common integer factor of one would thus maximize the period of the remainder sequence. For prior art accumulators, employing a weighted binary number system, any value of phase increment word that is an odd number will result in a greatest common integer factor of one and therefore a maximum period for the remainder series. Thus 50% of all possible phase increment word values in a weighted binary system will possess this desirous property. Of the phase increment word values that are even numbers, those that are integer powers of two will result in no line spurs because the numerical capacity of the accumulator is an integer multiple of these phase increment word values. For a weighted binary accumulator with capacity $2^N$ there are $2^{N-1}$ possible phase increment word values (in order to satisfy the Nyquist sampling criteria) of which N−1 of these values result in no line spurs. Furthermore, these values of the phase increment word that result in no line spurs are in fixed locations. A sweep of frequencies using only these values would always result in a non-linear frequency chirp. All other even values of the phase increment word in a weighted binary accumulator result in a variable, non-maximum, remainder series period and thus in line spurs whose energies depend upon the phase increment word value used. Essentially 50% (for practical accumulators with large N) of all phase increment word values in a weighted binary system result in this non-minimized line spur condition.

A third source of error (phase compression or $e_{pc}$) in the known method arises from the truncation of the phase accumulator bits used to address the read only memory. For every bit used in addressing the read only memory, the number of entries in the read only memory doubles; thus the size of the read only memory becomes impractical if too many of the phase accumulator bits are used to address it. Although the phase accumulator can accommodate many bits of phase resolution, only the most significant bits can be used, as a practical matter, to address the read only memory. The truncation of the less significant phase accumulator bits results in a storage compression nonlinearity error because the digitized waveform sample produced from the compressed read only memory will be at least slightly out of phase with the waveform sample that would have been produced had the less significant phase accumulator bits not been truncated and the read only memory not been compressed. This error also generates line spurs in the frequency spectrum of the periodic waveform being generated. The number, magnitude, and location of all these line spurs can be determined mathematically. Several numerical techniques have been developed to use at least some of the truncated phase accumulator bits in subsequent processing of the digitized waveform samples. In this way some of the phase precision is recovered. These techniques, however, take advantage of some of the symmetrical and geometrical properties of sinusoidal waveforms and would not be appropriate for an arbitrary generalized function waveform.

The fourth source of error (amplitude quantization or $e_{aq}$) arises from the finite word length of the weighted binary waveform sample stored in the read only memory. This is also a quantization error that could be reduced by increasing the word size of the waveform sample. Increasing this word size, however, would increase the size of the read only memory. Furthermore, the reduction of this error is limited by the number of bits used by the subsequent digital-to-analog converter. It is useless to store more bits of precision for the digitized waveform samples than the digital-to-analog converter can use. In all digital applications where a digital-to-analog converter is not used the weighted binary word length of the digitized waveform samples will still be limited by the increased computation time in subsequent processing caused by increased carry propagation time as discussed earlier.

SUMMARY OF THE INVENTION

The longstanding but heretofore unfilled need for a digital frequency synthesizer capable of producing sinusoidal or nonsinusoidal waveforms with enhanced frequency resolution, low noise, and fast calculation time is now fulfilled. The present invention accomplishes these breakthroughs by eliminating the use of the time consuming and performance limited weighted binary system in the phase accumulator and by iteratively calculating the digitized waveform samples from initial data points stored in a read only memory rather than storing the digitized waveform samples themselves in the read only memory. Thus the present invention represents a radical departure from the approach of the prior art.

More particularly, the present invention provides a phase accumulator apparatus that operates with a predetermined residue number system instead of the prior art weighted binary system, and further includes a means that supplants the prior art method of looking up digitized waveform values in a read only memory. Both of these improvements lower noise levels, decrease calculation time, increase design flexibility, and enhance spectral purity. Thus, a radar or other system equipped with the novel apparatus will have enhanced performance characteristics.

It is therefore clear that an important object of the present invention is to advance the art of digital frequency synthesizers having a heretofore unobtainable reduced noise level.

Another important object is to provide such a digital frequency synthesizer having faster calculation time than heretofore obtainable.

Another important object is to provide such a digital frequency synthesizer that has reduced truncation and compression errors of the type associated with earlier systems.

Still another important object is to provide such a digital frequency synthesizer with more flexible design parameters than those heretofore available.

These and other important objectives, features, and advantages of the invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

The best mode for carrying out the present invention is best understood when compared to the prior art structure mentioned briefly above. Thus, a more in depth analysis of the prior art will now be presented, followed by a detailed description of the present invention.

Figure 1:
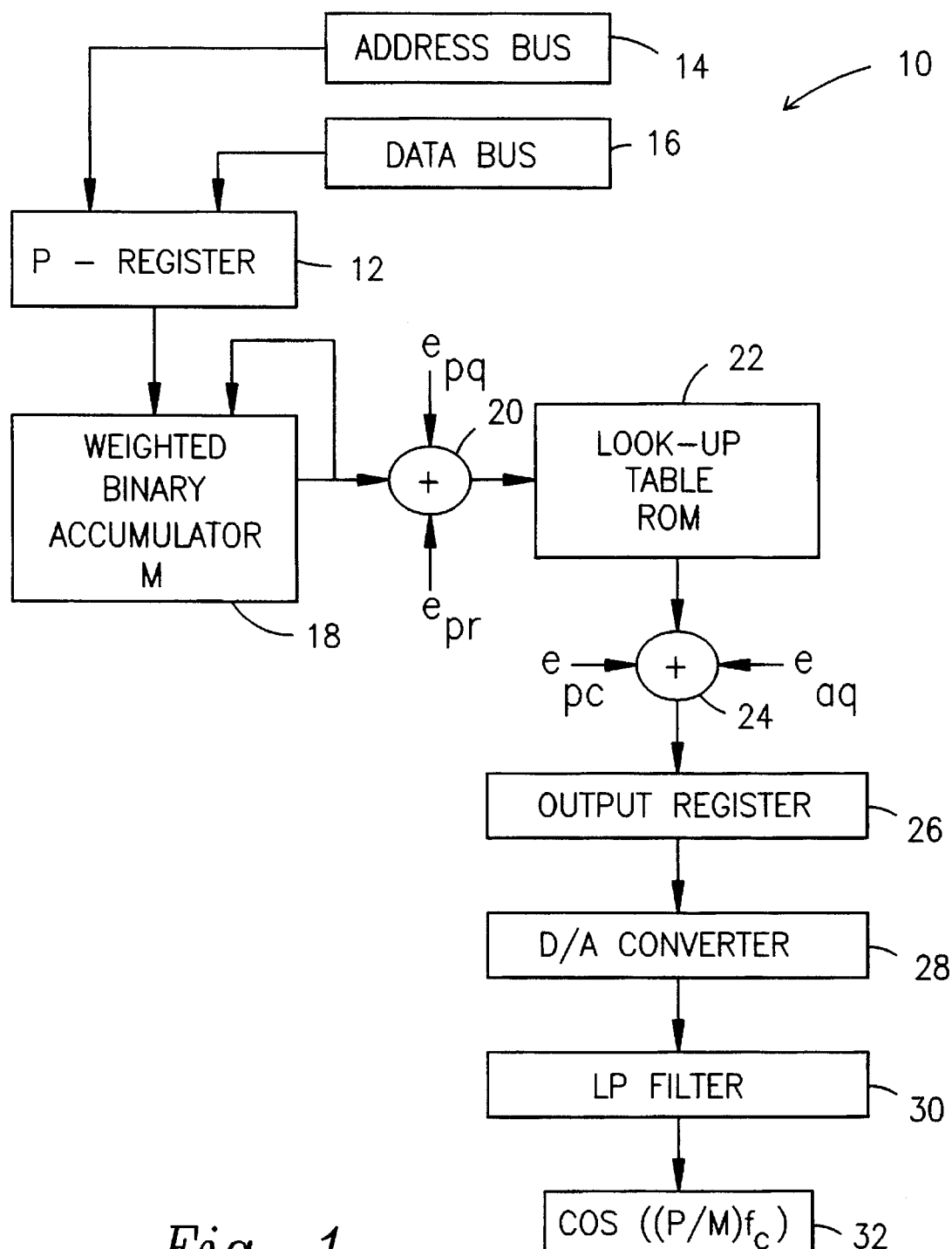
FIG. 1 is a diagrammatic representation of a prior art digital frequency synthesizer.

The prior art technique for digital frequency synthesis can be better appreciated by making reference to FIG. 1, which depicts the prior art apparatus denoted 10 as a whole. The input of phase increment register 12 is electrically connected to address bus 14 and data bus 16, and its output is electrically connected to accumulator 18. The number stored in the phase increment register 12 is denoted as P and the numerical capacity of the accumulator 18 is denoted as M. In this prior art configuration both these apparatus are implemented using a weighted binary number system. Thus M will always be some power of two. For the reasons pointed out above, this configuration introduces both a phase quantization error $e_{pq}$ and a phase accumulator overflow remainder series (rollover) error $e_{pr}$, both of which are indicated as at 20 to simplify the drawing. The signal with both of said errors then flows to read only memory 22 containing digitized waveform samples. The resulting waveform now includes a phase truncation/waveform compression error $e_{pc}$ and a waveform quantization error, $e_{aq}$ both of which are denoted 24. That signal is then fed to output register 26 and said output register outputs the signal to digital-to-analog converter 28. The signal finally passes through low pass filter 30 and the result is a periodic analog waveform 32 having a controlled output frequency equal to the sample clock frequency multiplied by the ratio of the phase increment value P to the numerical capacity of the accumulator M and including errors from said four sources. When the periodic waveform 32 is used as part of a detection means, the incoming frequencies will be misdetected by the cumulative amounts of said errors. Similarly, when the periodic waveform 32 is used as a part of a transmission, as in a radar chirp, the frequencies of the chirp will be different from the intended chirp frequencies by the cumulative amount of said errors.

Figure 2:
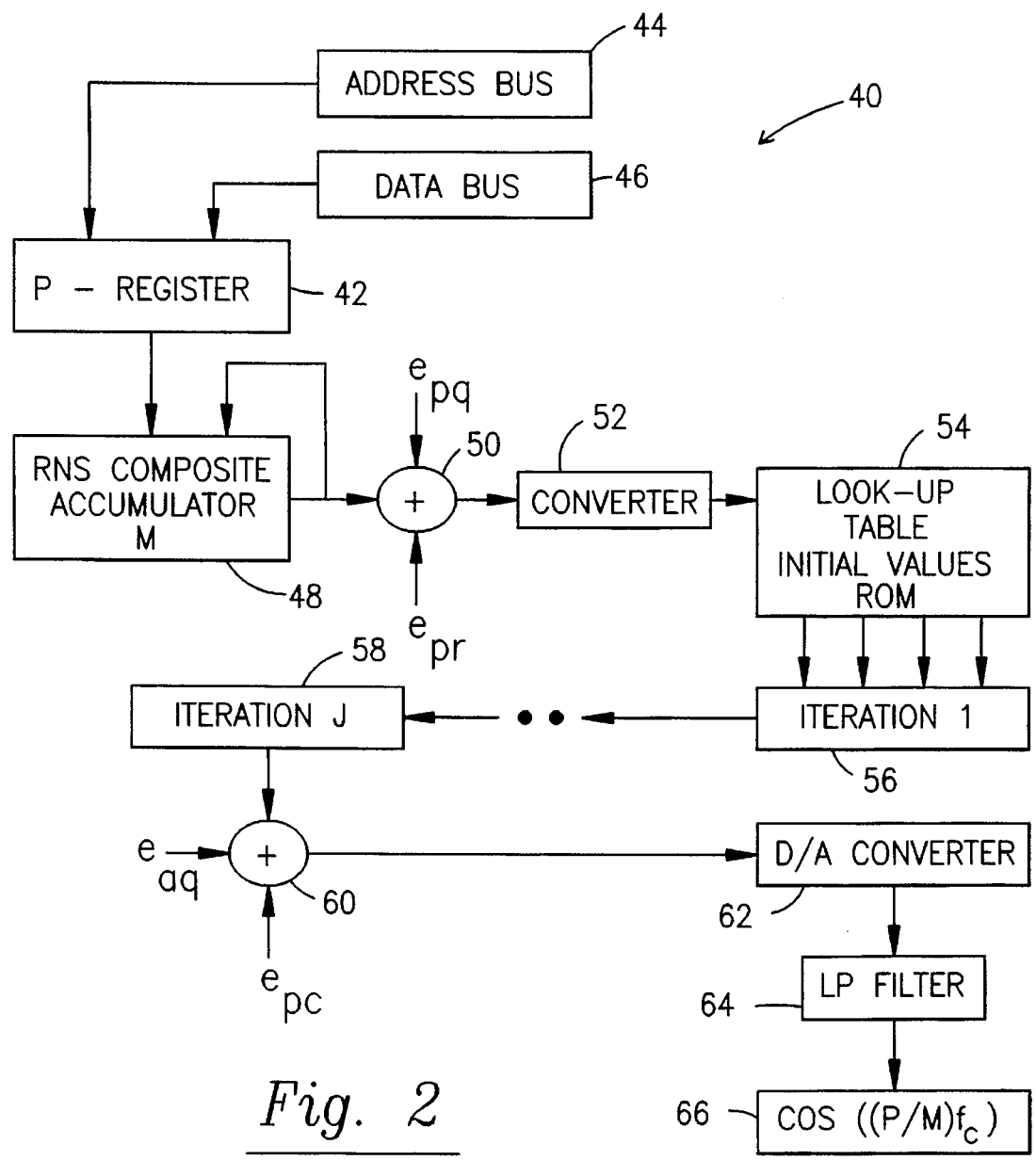
FIG. 2 is a diagrammatic representation of a first illustrative embodiment of the invention.

Referring now to FIG. 2, it will there be seen that the novel apparatus is denoted as a whole by the reference numeral 40.

The input of phase increment register 42 is in electrical communication with address bus 44 and data bus 46. The contents of this register is a phase increment word in a predetermined residue number system format. The output of the phase increment register is in electrical communication with a predetermined residue number system accumulator 48. Accumulator errors 50 will be smaller than heretofore obtainable due to the use of a predetermined residue number system in accumulator 48.

This reduction in error is a result of the properties of residue number systems. The modulus of each digit in such a system must be relatively prime with the modulus of any other digit. The first source of error discussed in the prior art is reduced because residue number systems, in general, are not weighted. Calculations for each digit require only the data for that digit and are not dependent upon a carry from any other digit. Thus, the numerical capacity of the RNS system (the product of all the digit modula) can be increased over that of the prior art, reducing the phase quantization error and allowing a finer frequency resolution, without increasing the calculation time as in the prior art.

The second source of error in the prior art was the periodic overflow remainder sequence generated when the numerical capacity of the accumulator was not an integer multiple of the phase increment word value used. In the prior art, employing a single weighted binary system accumulator, there were only a few fixed values of phase increment words that produced no line spurs. The quantity and value of such phase increment words in a residue number system is a design parameter that can be varied by the appropriate selection on programming of the number of digits and the modulus of each digit. The numerical capacity of the accumulator in any residue number system will be the product of each digit accumulator moldulus. It will be an integer multiple of any phase increment word value which is equal to the modulus of any of the pairwise relatively prime digits selected for the design or the product of any number of these digit modula. The frequencies that can be produced by these phase increment word values are not rigidly fixed in a nonlinear manner with respect to each other as in a weighted binary system and thus a linear sweep of these no line spur frequencies can easily be achieved. In addition, by restricting the modula of the design selected residue number system digits to strictly prime numbers it can be guaranteed that the greatest common integer factor common to any phase increment word value and the numerical capacity of the accumulator will be one except for those phase increment word values which are equal to an integer multiple of the modulus of any of the strictly prime digits or an integer multiple of a product of any number of these digit modula. As a result of these properties, a wide variety of residue number system accumulators can be designed that allow using more than 90% of all possible phase increment word values while still achieving a maximum period for the accumulator overflow remainder series and thus minimized line spur energy.

Since residue number system digits are not weighted they cannot be used to address a read only memory directly. Converter 52 in FIG. 2 converts the residue number system digits into a weighted number system such as the weighted binary system. One method of accomplishing this is by employing the Chinese Remainder Theorem or other suitable RNS to binary converter. Converter 52 represents additional hardware, but the calculations made thereby may be pipelined.

Read only memory 54 does not include quantized waveform samples as in the prior art. Instead, it stores initial data points used as a starting point in an iterative process to calculate approximations to the desired waveform sample. One such iterative process for calculating these approximate waveform samples is the cubic splines approximation technique using forward difference equations.

More particularly, the initial data points for a preselected function are the endpoints of cubic spline approximation polynomials; the endpoint of a cubic spline polynomial at each address corresponds to phase angle information having the same value as desired waveform at the same phase angle.

The endpoints of said cubic spline polynomials also reflect the slopes of the polynomials and the slope of a cubic spline approximation polynomial at each address corresponds to phase angle information having the same slope as a desired waveform at the same phase angle.

The approximation process includes the iteration process; the process begins at iteration station 56 and continues through a series of iterations concluding at iteration station 58. This iteration process utilizes some or all of the least significant converted binary accumulator bits that were truncated from the read only memory address and thus reincorporates their precision into the final approximation of the waveform sample. The accuracy of the approximation increases with each iteration, but there could remain, by design choice, a truncation error (the third error source discussed in the prior art). This error, however, will be diminished because the precision of some or all of the truncated phase bits will be reincorporated in the final approximation by way of the iteration process. The approximation technique of this invention should be differentiated from some of the prior art techniques mentioned earlier that rely upon the symmetry and geometry of sinusoidal signals. The approximation technique of this invention does not rely upon any such specific waveform properties and thus could be used to approximate any arbitrary function waveform including linear ramps, sawtooth, and other nonsinusoidal waveforms.

In this embodiment the initial data points are stored as weighted binary system numbers in the read only memory and the iteration process is performed using weighted binary arithmetic. This is because external digital-to-analog converter 62 requires a weighted binary system input. This slows down the approximation calculations, but these calculations may also be pipelined without seriously degrading the performance of the digital frequency synthesizer 40. The final signal therefore is a periodic analog waveform having a controlled output frequency equal to the sample clock frequency multiplied by the ratio of the phase increment value P to the numerical capacity of the accumulator M. This still includes errors from said four sources but the first three of those error sources are diminished.

In a second, all digital embodiment, external digital-to-analog converter 62 is obviated and therefore the final waveform approximation does not need to be in weighted binary format. In this embodiment, read only memory 54 stores the initial data points in a predetermined residue number system and the approximation calculations are performed using residue number system arithmetic. Since this arithmetic requires no carry information between digits, the precision of each final waveform approximation value can be increased without slowing down subsequent processing of the data (assuming subsequent processing was also performed using residue number system arithmetic). This has the effect of reducing the waveform quantization error identified as the fourth source of error in the discussion of the prior art.

In a third, all digital embodiment, read only memory 54 stores the initial data points in a predetermined quadratic residue number system and the approximation calculations are performed using quadratic residue number system arithmetic. In addition to allowing an increase in the precision of each final waveform approximation value without slowing down subsequent processing of the data (assuming subsequent processing was also performed using quadratic residue number system arithmetic) and thus reducing the waveform quantization error, the use of a quadratic residue number system allows the simultaneous calculation of both in-phase and quadrature versions of the waveform being generated.

Figure 3:
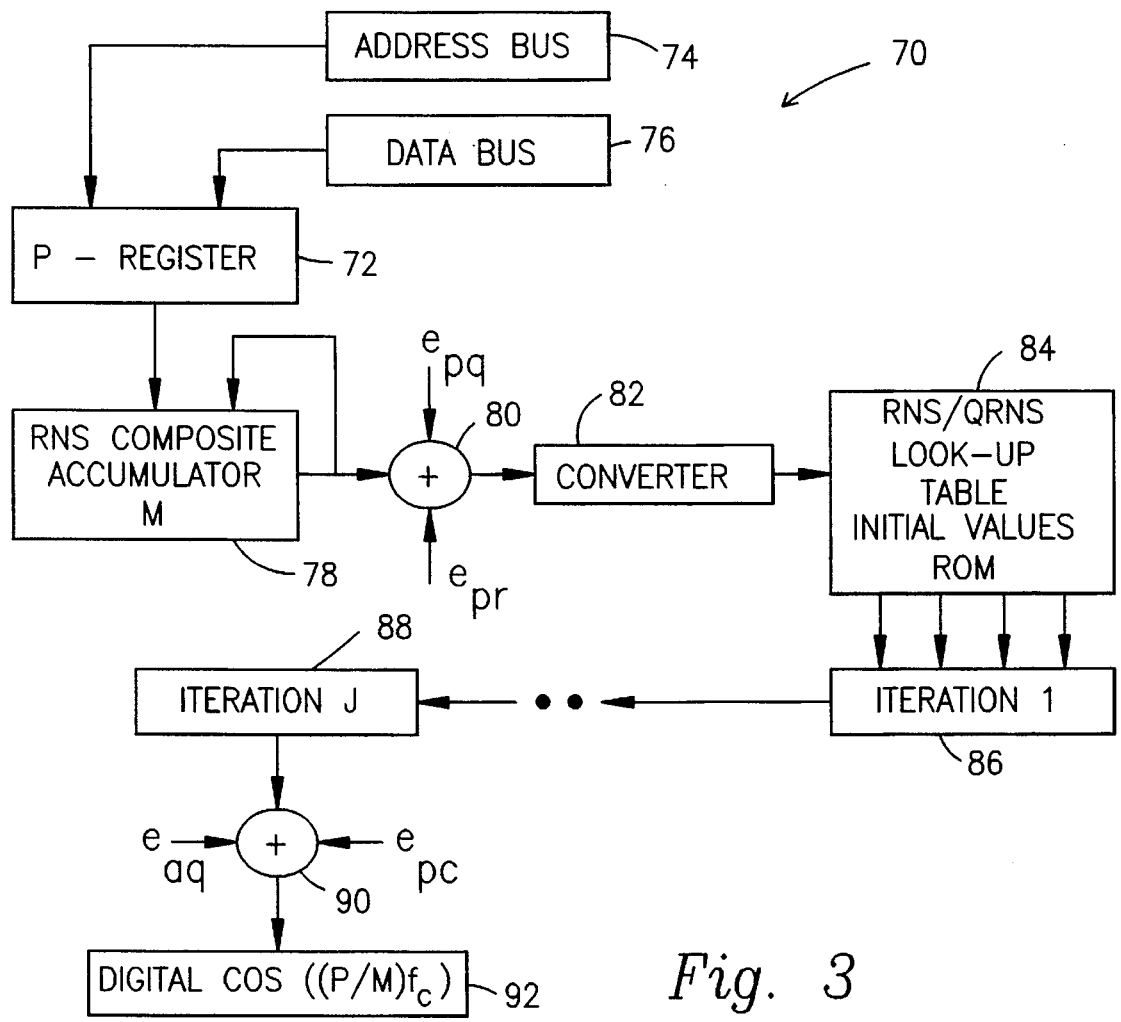
FIG. 3 is a diagrammatic representation of a second and third illustrative embodiment of the invention.

The second and third embodiments are depicted in figure 3 and are denoted 70 as a whole. The input of phase increment registers 72 are electrically connected to address bus 74 and data bus 76, and its output is electrically connected to the residue number system accumulator 78. The accumulator output 80 is converted into a weighted number system representation at conversion means 82 and is then fed to read only memory 84 which contains the initial data point values in either a predetermined residue number system format or a predetermined quadratic residue number system format. The first in a series of iterations is performed at iteration means 86 and the last of said series is performed at iteration means 88. The final result, which includes a small truncation and/or amplitude quantization error 90, is a digitized waveform 92 (which may be a sinusoid or nonsinusoid) having a controlled output frequency equal to the sample clock frequency multiplied by the ratio of the phase increment value P to the numerical capacity of the accumulator M.

Thus the four sources of error inherent in the prior art method discussed earlier, (phase quantization error, accumulator overflow remainder series error, phase truncation/ waveform compression error, and waveform quantization error) are each diminished by the present invention. In addition, a significant amount of design flexibility has been introduced to the process of digital frequency synthesis allowing applications of the art in areas that were heretofore impractical or impossible.

This invention is clearly new and useful. Moreover, it was not obvious to those of ordinary skill in this art at the time it was made, in view of prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Now that the invention has been described,
What is claimed is:

1. A device that generates phase angle information, said phase angle information having utility in the synthesis of periodic waveforms, comprising:

a residue number system phase increment register having an output that provides phase increment words represented as a set of residue number system phase increment word digits;

residue number system accumulator having an input coupled to said output of said residue number system phase increment register for receiving said phase increment word digits;

said residue number system accumulator providing successive residue number system values as said residue number system accumulator successively receives said phase increment word digits;

said residue number system accumulator outputting a signal representing phase angle information;

said phase angle information being obtained through residue number system arithmetic and in the absence of a carry between residue number system digits.

2. The device of claim 1, wherein the digits of said residue number system are selected such that the modula of all of said digits are strictly prime numbers.

3. The device of claim 1, wherein the modula of the digits of said residue number system are selected to make the numerical capacity of said accumulator an integer multiple of a preselected number of preselected phase increment values.

4. The device of claim 1, wherein the modula of the digits of said residue number system are selected to make the greatest common factor shared by the numerical capacity of said accumulator and a preselected number of preselected phase increment values equal to one.

5. The device of claim 1, further comprising:

a read only memory having a plurality of addresses;

said plurality of addresses addressing a set of initial data points for an arbitrary preselected function stored in said read only memory wherein each address of said plurality of addresses corresponds to one initial data point;

said phase angle information being employed to generate said plurality of addresses for said read only memory; and iteration means for approximating data points of a periodic waveform by applying said initial data points selected from said read only memory by said phase angle information.

6. The device of claim 5, wherein the initial data points for a preselected function are the endpoints of cubic spline approximation polynomials and wherein the endpoint of said cubic spline approximation polynomial at each said address corresponding to said phase angle information has the same value as a desired waveform at the same phase angle.

7. The device of claim 6, wherein said endpoints of said cubic spline approximation polynomials also reflect the slopes of the polynomials and wherein the slope of said cubic spline approximation polynomial at each said address corresponds to said phase angle information having the same slope as a desired waveform at the same phase angle.

8. The device of claim 5, wherein the periodic waveform is a sinusoidal waveform.

9. The device of claim 5, wherein said initial data points are stored as weighted binary numbers and the subsequent calculations to obtain the final data points are performed using weighted binary arithmetic.

10. The device of claim 5, wherein said initial data points are stored as residue number system digits and the subsequent calculations to obtain the final data points are performed using residue number system arithmetic.

11. The device of claim 5, wherein said initial data points are stored as quadratic residue number system digits and the subsequent calculations to obtain the final data points are performed using quadratic residue number system arithmetic, said quadratic number system arithmetic allowing the simultaneous calculation of both in-phase and quadrature representations of said periodic waveform.

12. The device of claim 5, wherein said iteration means for calculating the waveform approximations is a cubic spline approximation technique using forward difference equations.

13. A digital frequency synthesizer, comprising:

an accumulator of predetermined capacity that generates an electrical signal containing phase angle information;

a phase increment register of predetermined length for providing phase increment word digits of selectable values to said accumulator at a predetermined sample clock frequency, the preselected value of said phase increment word digits, the predetermined numerical capacity of said accumulator, and the predetermined sample clock frequency determining the frequency of overflow of said accumulator and the phase angle information content of said electrical signals;

said phase increment word digits being phase increment values expressed in residue number system format and said accumulator performing additions using residue number system arithmetic so that the addition of said values is performed in the absence of arithmetical carry from one residue number system digit into another;

the modula of the digits of said residue number system being preselectable as strictly prime numbers;

the modula of the digits of said residue number system being preselectable so as to make the numerical capacity of said accumulator an integer multiple of a preselected number of preselected phase increment values;

the modula of the digits of said residue number system being preselectable so as to make the greatest common factor shared by the numerical capacity of said accumulator and a preselected number of preselected phase increment values equal to one;

a read only memory containing a look-up table of initial data points for an arbitrary preselected function, each of said initial data points having a specific address in said read only memory;

an iteration means for calculating a final data point using said initial data point; and said initial data points being addressed in said read only memory by the phase angle content of said electrical signals generated by said accumulator.

14. The synthesizer of claim 13, wherein said initial data points are stored in said read only memory as weighted binary numbers and wherein said iteration means performs calculations using weighted binary arithmetic.

15. The synthesizer of claim 13, wherein said initial data points are stored in said read only memory as residue number system digits and said iteration means performs calculations using residue number system arithmetic.

16. The synthesizer of claim 13, wherein said initial data points are stored in said read only memory as quadratic residue number system digits and said iteration means performs calculations using quadratic residue number system arithmetic.

17. The synthesizer of claim 13, wherein said iteration means employs a cubic spline approximation using forward difference equations.

* * * * *